United States Patent

Pürrer

[11] 4,020,995
[45] May 3, 1977

[54] DRIVE SYSTEM FOR CHOPPING APPARATUS

[75] Inventor: Josef Pürrer, Gottmadingen, Germany

[73] Assignee: Maschinenfabrik Fahr Aktiengesellschaft, Gottmadingen, Germany

[22] Filed: Nov. 7, 1975

[21] Appl. No.: 630,021

[30] Foreign Application Priority Data

Nov. 8, 1974 Germany .......................... 2453125

[52] U.S. Cl. .......................................... 241/101.2
[51] Int. Cl.² ........................................ A01D 75/08
[58] Field of Search ................................ 241/101.2

[56] References Cited

UNITED STATES PATENTS 3,889,887  6/1975  Wagstaff et al. ............... 241/101.2

Primary Examiner—Granville Y. Custer, Jr.

Attorney, Agent, or Firm—Karl F. Ross; Herbert Dubno

[57] ABSTRACT

A chopping apparatus has a housing on one side of which is provided a chopper reel rotatable in a forward direction for chopping and a reverse direction for sharpening, and on its other side with a fan rotatable in a reverse direction for discharging chopped crop supplied to it by a conveyor extending across the housing from the chopper. A transmission has a unidirectionally rotatable input shaft and a pair of mutually oppositely rotating and parallel output shafts. This transmission is secured to the fan side of the housing and the fan is directly carried on one of the output shafts. These output shafts are both exposed toward the chopper and either of them can be connected to the chopper drive by means of a universal-joint shaft having a snap coupling releasably connectable to either of the shafts for changing rotation direction of the reel independently of the fan.

6 Claims, 1 Drawing Figure

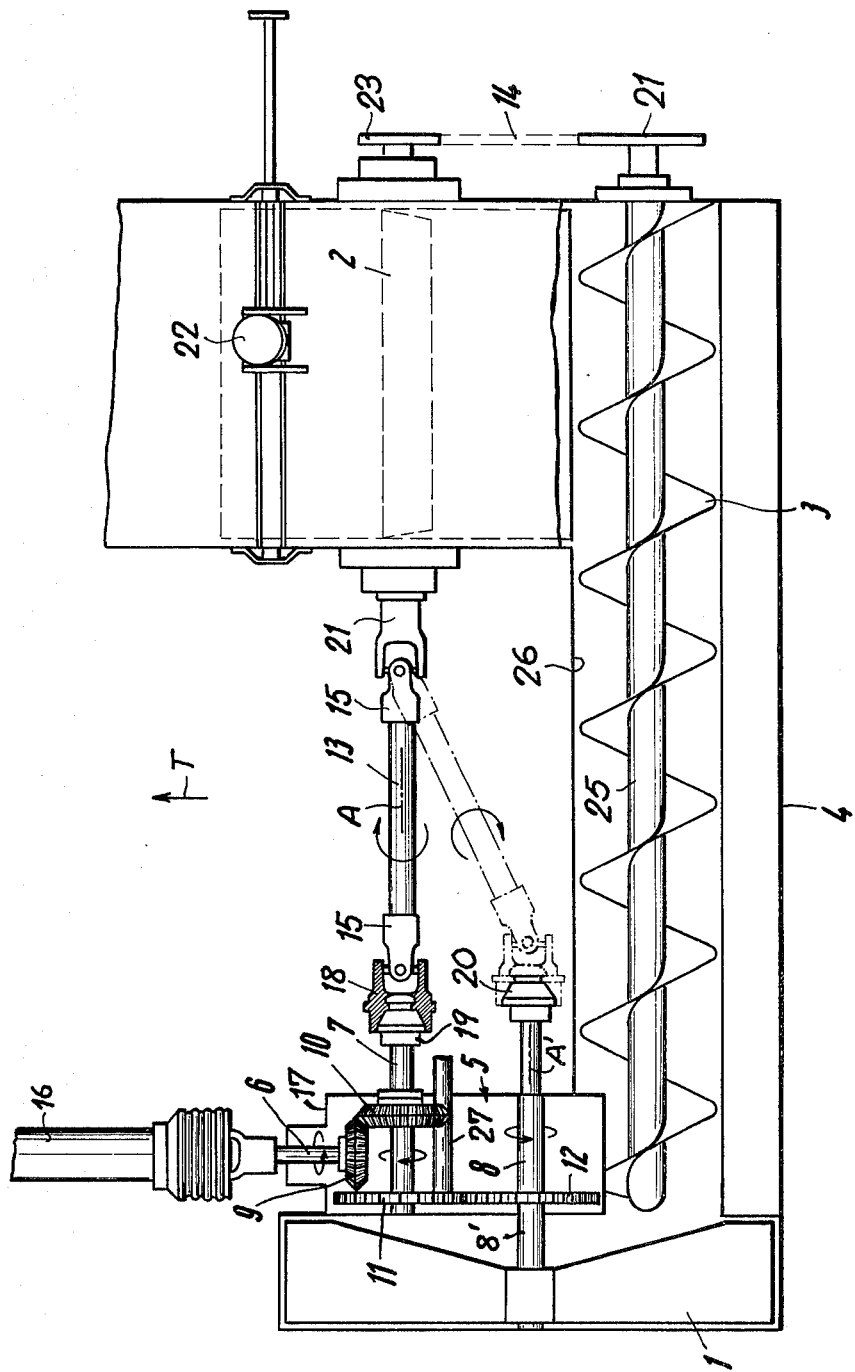

DRIVE SYSTEM FOR CHOPPING APPARATUS

FIELD OF THE INVENTION

The present invention relates to a chopping apparatus. More particularly this invention concerns a drive arrangement for a crop chopper.

BACKGROUND OF THE INVENTION

A crop chopper typically has a chopping reel that is rotated in order to reduce crop, such as corn, alfalfa or the like, to small pieces which are then fed to a blower that propels them in a stream into a following wagon, baler, or the like. It is known to rotate the fan and chopping reel in the same direction (see German published specification No. 2,134,191). In such devices the input and output sides must be directly diametrically opposite one another so that the apparatus is relatively long. Typically, in such devices a transverse conveyor, such an an auger, is provided to transport the chopped crop from the chopping reel to the discharge blower.

It is also necessary in such devices to be able to rotate the chopping reel in reverse in order to sharpen it with a stone displaceable across the reverse rotating wheel. During the sharpening operation it is essential to decouple the fan from the drive. Thus it is necessary to provide a complicated switchover mechanism in order to allow the necessary gears or the like to be connected to the drive for the chopping reel in order to reverse same independently of the fan.

OBJECTS OF THE INVENTION

It is therefore an object of the present invention to provide an improved chopping apparatus.

Yet another object is the provision of an improved drive system for a chopping apparatus.

SUMMARY OF THE INVENTION

These objects are attained according to the present invention in a chopping apparatus wherein the chopping reel of the device is mounted on one side of the support therefor and the fan of the discharge means is mounted on the opposite side of the support. A conveyor extends laterally across the support between the sides to move the chopped crop from the chopping means to the discharge means. A transmission is provided on the housing between the reel and the fan and has a unidirectionally rotatable input and a pair of mutually oppositely rotatable and parallel output shafts one of which is permanently connected to the fan and both of which have ends exposed toward the reel. Means is provided for connecting either of these shafts ends to the reel for rotatably driving same so that the reel is rotated in reverse when connected to the same shaft as the fan and forwardly when connected to the exposed end of the other shaft.

Such an arrangement is extremely compact, as the chopping reel and the fan are mounted next to each other, and the transmission for driving both of them in opposite directions is provided in the normally unusable space between them. This arrangement makes it very easy to reverse the rotation direction of the chopping reel in order to sharpen the reel. No separate reversing drive or complicated changeover is necessary to reverse rotate this reel without reverse rotating the blower so that the discharge can continue.

According to further features of this invention the fan is mounted directly on one of the drive shafts of the transmission and the chopper is normally connected to the other drive shaft so that the forward rotation direction of the transmission and the normal discharge rotation direction of the fan are opposite. The exposed ends of the drive shafts of the transmission are provided with snap couplings that can be connected to a snap coupling on a cardan shaft whose other end is connected via a universal joint to the chopper. Thus to change rotation directions the operator need merely unsnap the chopper drive shaft from the one shaft of the transmission and snap it onto the other, an operation taking very little time. Such an arrangement is also extremely inexpensive and virtually trouble free.

According to further features of this invention the input shaft for the transmission is coplanar with the two output shafts and perpendicular thereto. The conveyor means between the two sides of the chopping apparatus is an auger journaled on the housing at the same side as the chopping apparatus and driven codirectionally with this chopping apparatus by means of a belt drive.

BRIEF DESCRIPTION OF THE DRAWING

The above and other objects, features, and advantages will become more readily apparent from the following, reference being made to the accompanying drawing whose sole FIGURE is a top view, partly in section, illustrating the apparatus in accordance with this invention.

SPECIFIC DESCRIPTION

As shown in the drawing the apparatus according to the present invention has a housing 4 carrying on one side a fan 1 and on the other side a chopper 2 with a conveying device 3 extending between the sides. This housing 4 is part of a field chopper and is adapted to be displaced along the ground in a transport direction T.

A tractor ahead of the housing 4 has a power take-off shaft 16 releasably connected with the forwardly extending input shaft 6 of a transmission 5 having a housing 17. This transmission 5 has a pair of parallel shafts 7 and 8 defining respective axes A and A'. A bevel gear 9 carried on the input shaft 6 which is coplanar with and perpendicular to the shafts 7 and 8 meshes with another bevel gear 10 carried on the shaft 7. A spur gear 11 carried also on this shaft 7 meshes with a spur gear 12 carried on the shaft 8 so that the shafts 7 and 8 will always rotate in opposite directions. Both of the shafts 7 and 8 have ends which extend out of the housing toward the housing toward the chopper 2 and the shaft 8 has an end 8' which extends out of the housing 17 on the opposite side and carries the discharge fan 1. The ends of the shafts 7 and 8 extending toward the chopper 2 are provided with snap-coupling halves 19 and 20.

The chopper 2 has an input shaft 21 provided at its ends with universal joints 15 connected to a shaft 13 carrying on its far end a snap-coupling half 18 that can quickly and releasably be connected to either of the halves 19 and 20. The chopper reel 2 is rotatable about the same axis A as the shaft 7 so that when the snap-coupling halves 18 and 19 are united the shaft lies on this axis A and the universal joints 15 at its ends are straight.

When the shaft 13 is connected to the coupling half 20 of the shaft 8 it extends at an angle to the axis A and to the axis A' so that both of the universal joints 15 are employed. In order to facilitate this coupling the half 20 is closer to the chopper 2 than the half 19, so that an inexpensive connecting shaft 13 which need not be provided with extensive telescoping splines may be employed.

As also shown in the drawing the chopper 2 is provided with a sharpening arrangement 22 which can be moved across the reel 2 in order to sharpen same. For sharpening the coupling halves 18 and 20 are united in order to reverse rotate the chopper 2, and the device 22 is displaced across it. During normal chopping operation the coupling halves 18 and 19 are joined and the chopper 2 is rotated in a forward direction opposite to the rotation direction of the fan 1.

The far end of the chopper 2 is provided with a pulley 23 connected via a belt 14 to a pulley 24 carried on the far end of the auger 25 constituting the conveyor 3. This auger 25 is only journaled at its end adjacent to the chopper 2 so as to float freely in the passage 26 provided for it and, thereby, be relatively trouble free and jam proof.

In addition another output shaft 27 may be provided to give another output ratio.

I claim:

1. A chopping apparatus comprising:

a support having a pair of opposite sides;

chopping means on said support at one of said sides including a chopping reel rotatable in a forward direction for chopping crop and in a reverse direction;

discharge means on said support at the other side thereof spaced from said chopping reel and including a fan rotatable in one direction for blowing out chopped crop;

conveyor means on said support extending between said reel and said fan for transporting chopped crop from the former to the latter;

a transmission on said other side of said housing between said reel and said fan, said transmission having a housing, a unidirectionally rotatable input shaft a pair of mutually oppositely rotatable and parallel output shafts perpendicular to said input shaft and projecting from said housing one of said output shafts being permanently connected to said fan and both of said output shafts having their projections from said housing formed with ends exposed toward said reel, and gearing in said housing continuously connecting both said output shafts for rotation in opposite sense to said input shaft; and means for connecting either of said ends to said reel for rotatably driving same, whereby said reel is rotated in reverse when connected to said end of said one output shaft and forwardly when connected to said end of the other output shaft, said exposed ends being both provided with respective snap couplings, and said connecting means including a shaft having one end provided with a universal joint connected to said reel and another end provided with a snap coupling releasably engageable with either of said snap couplings of said output shafts, said fan being mounted on an end of one of said output shafts opposite its said end projecting toward said reel.

2. The apparatus defined in claim 1 wherein said other output shaft is generally coaxial with the rotation axis of said reel.

3. The apparatus defined in claim 2 wherein said end of said one output shaft is closer to said one side than said end of said other shaft.

4. The apparatus defined in claim 1 wherein said fan has a housing and said transmission housing is connected directly thereagainst.

5. The apparatus defined in claim 1, further comprising sharpening means engageable with said reel during reverse rotation thereof to sharpen same.

6. The apparatus defined in claim 1 wherein said conveyor means includes an auger codirectionally rotatable with said reel.

* * * * *